US006223845B1

United States Patent

Miyachi et al.

(10) Patent No.: US 6,223,845 B1
(45) Date of Patent: May 1, 2001

(54) HYDRAULIC EXCAVATOR WITH ENGINE INTAKE AIR CLEANER ARRANGEMENT

(75) Inventors: Isao Miyachi; Hirofumi Watanabe, both of Hiroshima (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 0 days.

(21) Appl. No.: 09/405,221

(22) Filed: Sep. 27, 1999

(30) Foreign Application Priority Data

Sep. 28, 1998 (JP) ........................................ 10-291457

(51) Int. Cl.[7] ........................................ B60K 13/02
(52) U.S. Cl. ........................................ 180/68.3
(58) Field of Search ........................................ 180/68.3, 291, 180/68.1, 68.2, 68.4; 123/198 E

(56) References Cited

U.S. PATENT DOCUMENTS 2,595,558 * 5/1952 Altman ........................................ 123/198
2,708,920 * 5/1955 Pasturczak ........................................ 123/119
2,896,594 * 7/1959 Ashton ........................................ 123/41.04
3,788,418 * 1/1974 Clancy et al. ........................................ 180/68 R
4,071,009 * 1/1978 Kraina ........................................ 123/198
4,324,208 * 4/1982 Danckert et al. ........................................ 123/195 C
4,354,458 * 10/1982 Bury ........................................ 123/82 M
4,503,931 * 3/1985 Sugimoto et al. ........................................ 181/204

FOREIGN PATENT DOCUMENTS

0816575 * 6/1997 (EP) ........................................ E02F/3/38
0106973 * 4/1989 (JP) ........................................ 123/198

* cited by examiner

*Primary Examiner*—Brian L. Johnson
*Assistant Examiner*—G B Klebe
(74) *Attorney, Agent, or Firm*—Oblon, Spivak, McClelland, Maier & Neustadt, P.C.

(57) ABSTRACT

A construction machine equipped with an air cleaner is disclosed which does not affect the efficiency of an engine and that of a radiator and which makes an effective utilization of space. A rotatable superstructure is partitioned into a front portion and a rear portion by means of a shielding plate, one end of an attachment capable of rise and fall is secured to near the center of the said front portion, an engine space and a radiator space for accommodating an engine and a radiator respectively therein are formed in said rear portion, and an air cleaner for filtering the air to be fed to the engine is disposed between the mounted portion of the attachment and the shielding plate.

5 Claims, 4 Drawing Sheets

HYDRAULIC EXCAVATOR WITH ENGINE INTAKE AIR CLEANER ARRANGEMENT

BACKGROUND OF THE INVENTION

1. Field of the Invention

The present invention relates to a hydraulic excavator equipped with an air cleaner.

2. Description of the Related Art

Generally, a hydraulic excavator is driven by an internal combustion engine installed in the interior of a rotatable superstructure. A fan is attached to the engine and a radiator is disposed in front of the fan. The radiator, into which cooling water is introduced for cooling the engine, is cooled with air. The air for cooling the radiator is introduced into the interior of the rotatable superstructure from the exterior by means of the above fan. The air thus introduced cools the radiator and thereafter passes the engine space where the engine is disposed. The engine space and the space where the radiator is disposed are usually partitioned from each other by both the radiator and a shielding means to prevent hot air from reverse flowing from the engine space into the radiator space.

The air to be used for combustion in the engine carried on the hydraulic excavator is sucked in from an intake port, then is filtered through an air cleaner and is thereafter fed to the engine. The air thus fed is used for the combustion of fuel in the engine and is subsequently discharged to the exterior through a muffler attached to the engine.

The aforesaid air cleaner used in the hydraulic excavator, in view of its purpose of use, has heretofore been disposed in the engine space or in the radiator space in many cases.

However, in the hydraulic excavator called a small-sized swing type, the rotatable superstructure itself is small in comparison with that in other conventional hydraulic excavators and there is no margin in the interior space. Therefore, when the air cleaner is to be disposed in the engine space as in the prior art, it is unavoidable for the air cleaner to be disposed near the muffler or the engine which become high in temperature. As a result, the air cleaner itself is heated and the temperature of intake air to the engine becomes high, thus giving rise to the problem that the engine efficiency is deteriorated.

On the other hand, if the air cleaner is disposed in the radiator space, it is possible to solve the above-mentioned problem of deteriorated engine efficiency which is caused in the case of disposing the air cleaner in the engine space. However, since the air cleaner blocks the passage of air, the air will not pervade the whole of the radiator, thus resulting in deterioration of the radiator cooling efficiency.

SUMMARY OF THE INVENTION

It is an object of the present invention to provide a hydraulic excavator provided with an air cleaner which does not affect the efficiency of an engine and that of a radiator and which can attain an effective utilization of space.

The hydraulic excavator according to the present invention comprises a rotatable superstructure, a shielding plate which partitions the rotatable superstructure into a front portion and a rear portion, with an engine and a radiator being disposed in the rear portion, an attachment mounting portion disposed near the center of the front portion and to which one end of an attachment is mounted, and an air cleaner disposed between the attachment mounting portion and the shielding plate to filter the air to be fed to the engine.

According to this construction, since the air cleaner and the engine are partitioned for each other by the shielding plate, there is no fear that hot air present in the engine may be transferred to the air cleaner, nor is there any fear of the air cleaner itself being heated which would cause deterioration of the engine efficiency. Further, the space between the attachment mounting portion and the shielding plate is a very narrow space which has not been effectively utilized heretofore, but in the above construction according to the present invention, since the air cleaner is disposed in the said space, the space in question of the rotatable superstructure can be utilized effectively.

In the present invention, the rear portion of the rotatable superstructure may be partitioned into an engine space for accommodating the engine therein and a radiator space for accommodating the radiator therein, and a suction port of the air cleaner may be disposed in the radiator space.

According to this construction, since the suction port is smaller in size than the air cleaner, the disposition of the suction port is easier than disposing the air cleaner itself in the radiator space and it is not likely at all that the air passage will be blocked and hence there is no fear of deterioration in the radiator cooling efficiency.

In the present invention, the air cleaner may be disposed inside a guard of the rotatable superstructure.

According to this construction, there is no fear of any extra projection being formed on top of the rotatable superstructure, thus leading to an improvement in beauty of appearance, nor is there any fear that the rear view from the cabin may be obstructed, thus leading to an improvement of safety.

In the present invention, the air cleaner may be disposed above a rotating motor for rotating the rotatable superstructure.

According to this construction, since the space above the rotating motor is very narrow and has not been effectively utilized heretofore, the disposition of the air cleaner in such a space permits an effective utilization of space in the rotatable superstructure.

DESCRIPTION OF THE PREFERRED EMBODIMENTS

Figure 1:
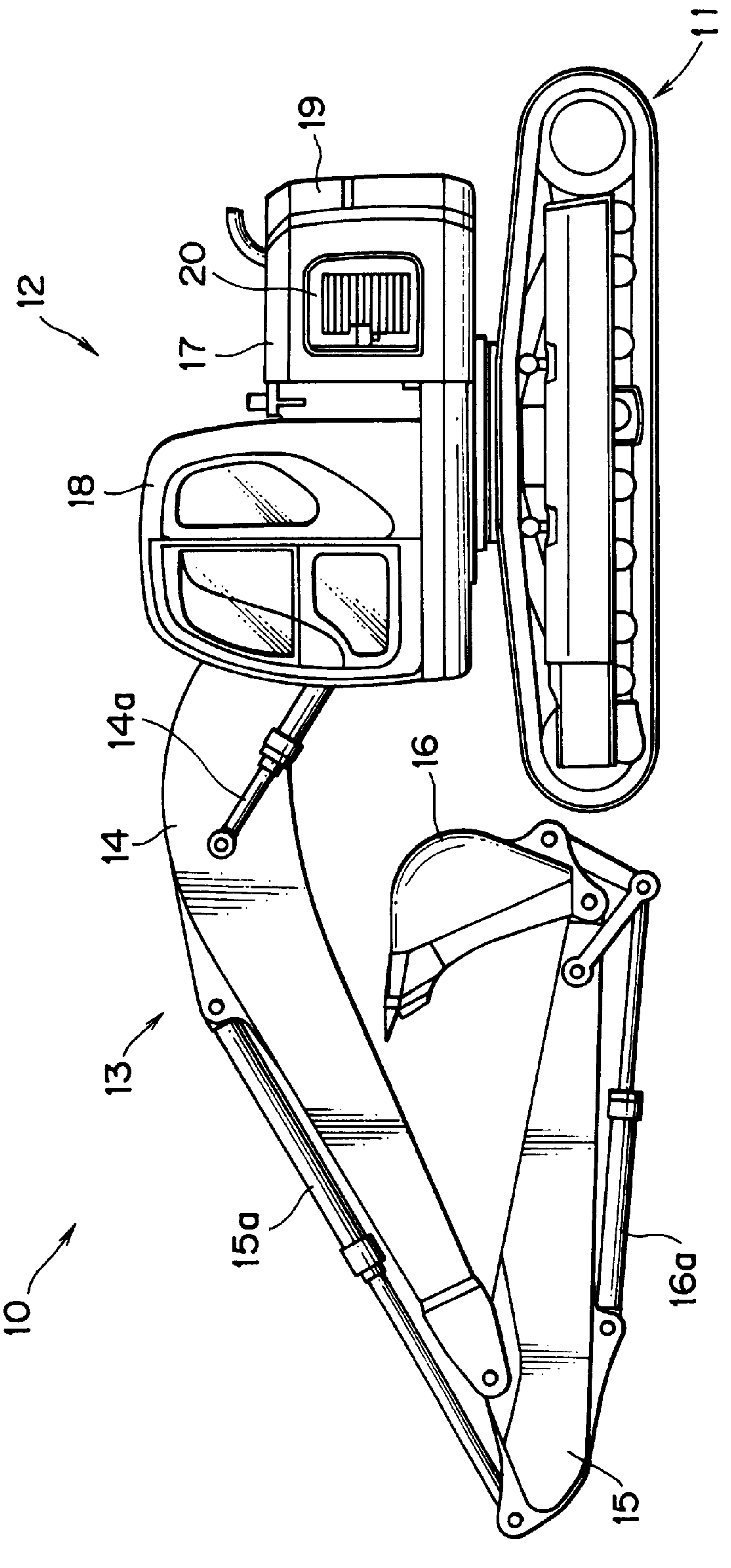
FIG. 1 is a side view of a hydraulic excavator as an example to which the present invention is applied.
Figure 2:
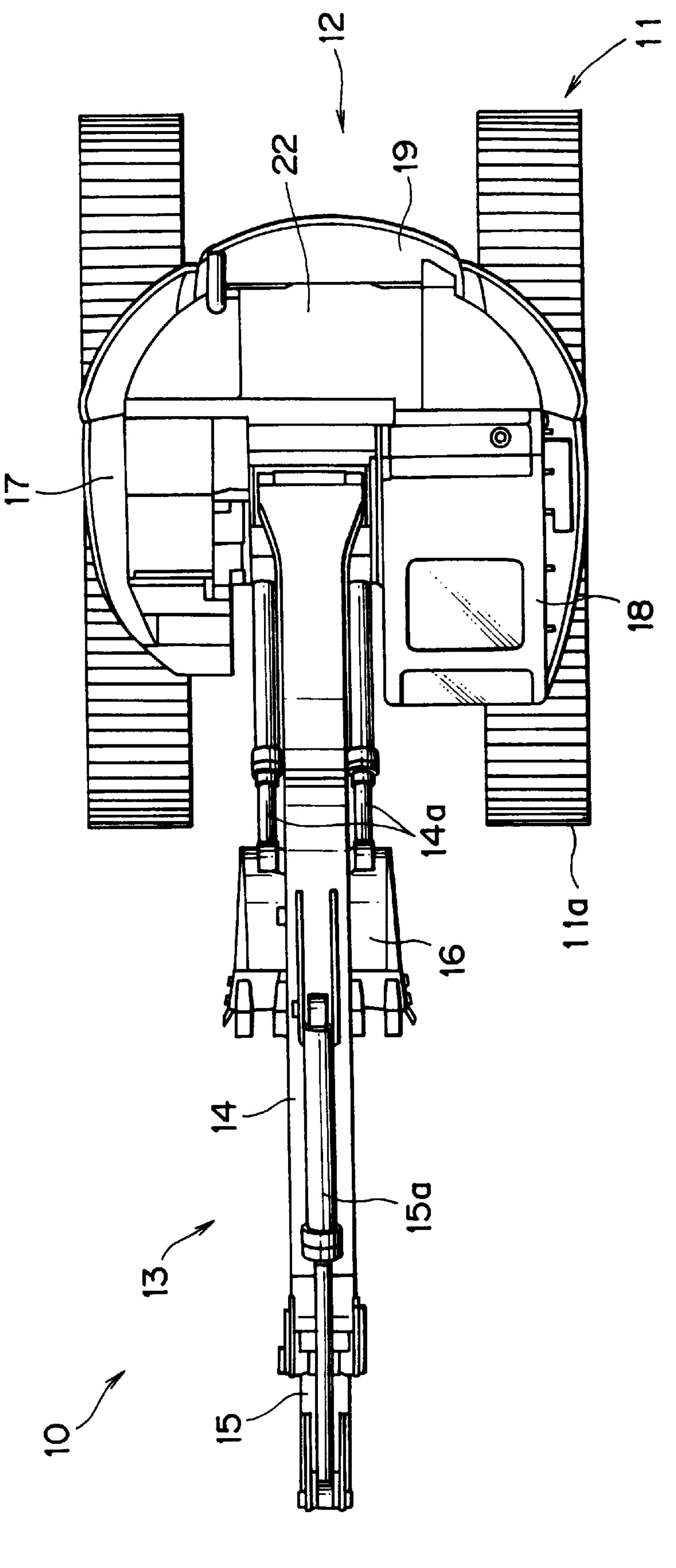
FIG. 2 is a plan view thereof.

Embodiments of the present invention will be described in detail hereinunder with reference to the accompanying drawings, in which FIG. 1 is a side view of a hydraulic excavator as an example to which the present invention is applied and FIG. 2 is a plan view thereof.

In FIGS. 1 and 2, the reference numeral 10 denotes a hydraulic excavator. The hydraulic excavator 10 is provided with a lower carriage 11 capable of traveling, a rotatable superstructure 12 carried rotatably on the lower carriage 11, and an attachment 13 which is secured at one end thereof to a central position of the front portion of the rotatable superstructure 12 so as to be capable of rising and fall pivotally.

The lower carriage 11 is provided with a pair of right and left crawlers 11*a* disposed in an endless rotatable manner at both ends of a center frame.

On the left-hand side of the front portion of the rotatable superstructure 12 is mounted a cabin 18 which is provided with an operator's seat. The rear portion of the rotatable superstructure 12, in which a counter weight 19 is provided, is covered with a guard 17. Inside the guard 17 are accommodated an engine and various other devices. A cover 22 capable of being opened and closed is attached o the upper surface of the guard 17 so as to be opened for maintenance of the engine, etc. Also on the left-hand side of the rear portion of the guard 17 is mounted a cover 20 so that it can be opened and closed. Air is introduced through a vent opening formed in the cover 20 to cool a radiator, etc.

The attachment 13 has a boom 14 one end of which is secured to the rotatable superstructure 12, an arm 15 one end of which is secured to the opposite end side of the boom 14, and a bucket 16 secured to a front end portion of the arm 15. The boom 14 can be made to rise and fall by a pair of boom cylinders 14*a* both ends of which are connected to the front portion of the rotatable superstructure and the boom 14, respectively. The arm 15 is made pivotable by an arm cylinder 15*a* disposed between the back side of the boom 14 and an end portion of the arm 15. Further, the bucket 16 is made pivotable by a bucket cylinder 16*a* disposed between the bucket 16 and the back side of the arm 15.

Figure 3:
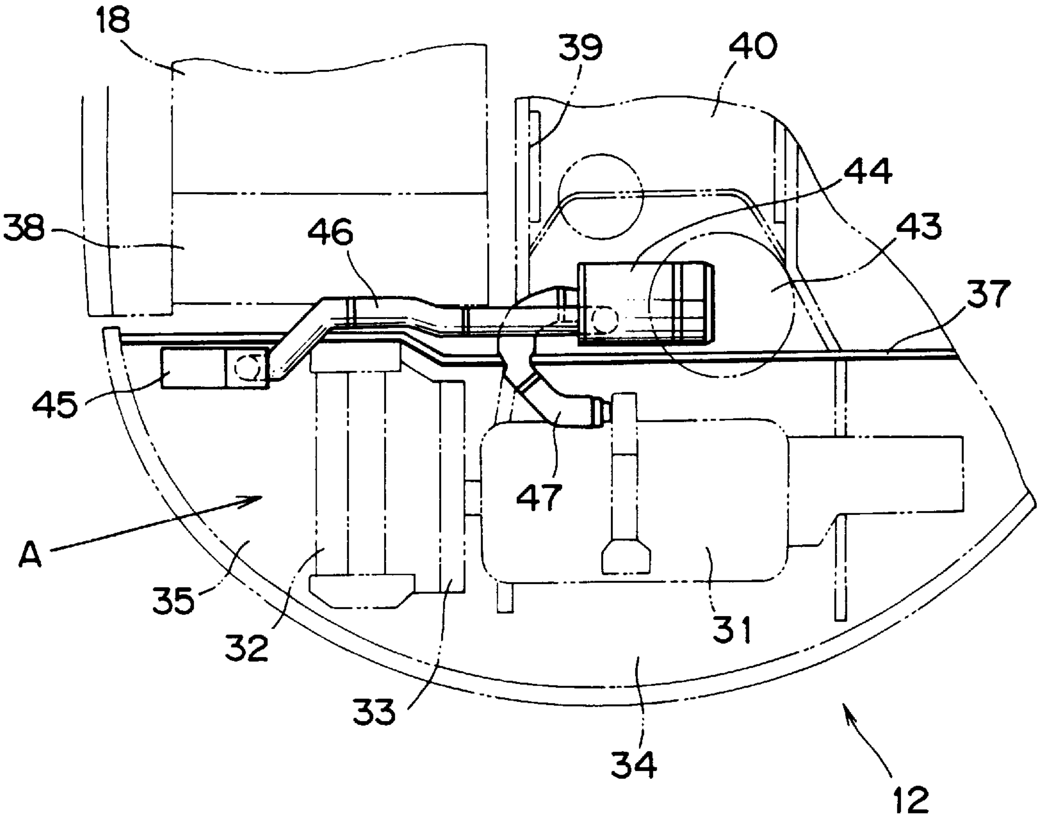
FIG. 3 is a top view showing an internal structure of a rotatable superstructure of a hydraulic excavator embodying the present invention.
Figure 4:
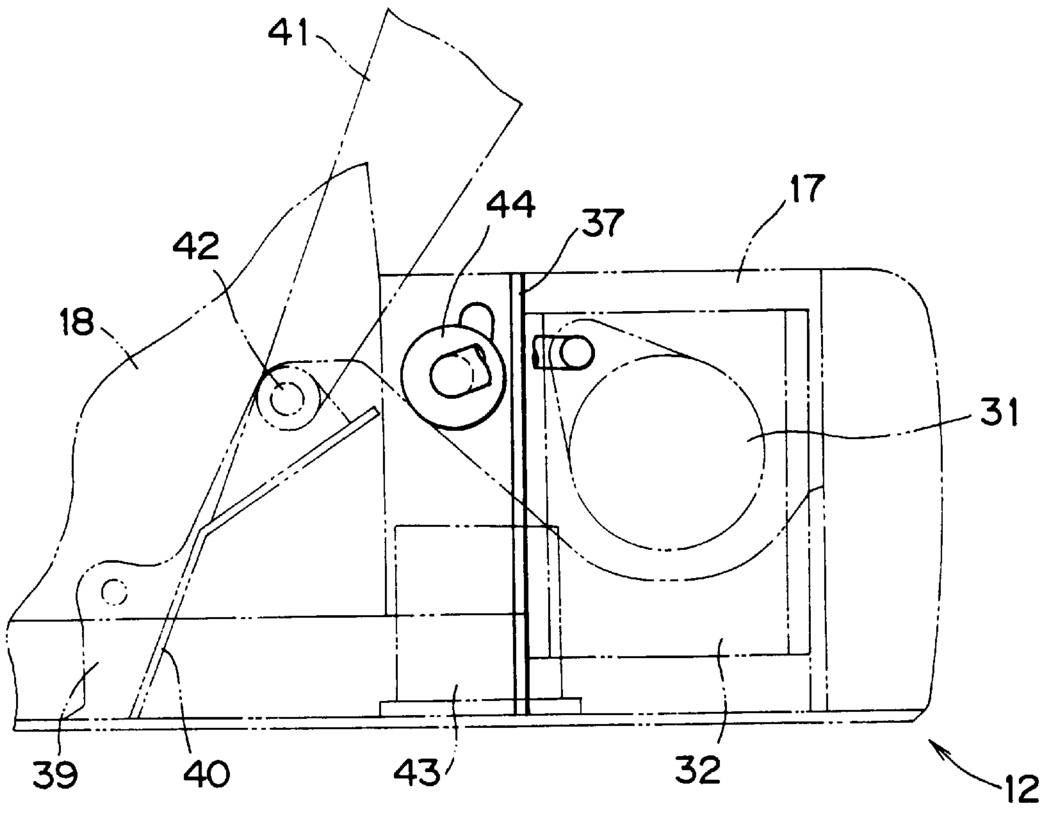
FIG. 4 is a left side view thereof

FIG. 3 is a top view showing an internal structure of a rotatable superstructure of a hydraulic excavator embodying the present invention and FIG. 4 is a left side view thereof. In both figures, as to the portions identified by the same reference numerals as in FIGS. 1 and 2, explanations thereof will be omitted.

In FIGS. 3 and 4, the numeral 31 denotes an engine, and a fan 33 is secured to the front portion of the engine 31 rotatably. In front of the fan 33 is mounted a radiator 32. The fan 33 introduces air from the exterior of a rotatable superstructure 12 like arrow A. The air cools the radiator 32 and then passes the engine 31.

The space where the radiator 32 and the engine 31 are disposed is partitioned into a radiator space 35 and an engine space 34 by the radiator 32, whereby hot air present in the engine space 34 is prevented from reverse flowing into the radiator space 35.

In a left central portion of the rotatable superstructure 12 is mounted a tank 38 and a cabin 18 is provided in front of the tank 38. In a front central portion of the rotatable superstructure 12 are erected a pair of brackets 39 in a sandwiching relation to a plate 40. Holes 42 for the boom, as attachment mounting portions, are formed respectively in the tops of the brackets 39. The holes 42 and a boom 41 are engaged with each other pivotably through a boom foot pin (not shown). Further, in a right front portion of the rotatable superstructure 12 are disposed hydraulic devices (not shown), and centrally disposed is a rotating motor 43 for rotating the rotatable superstructure 12.

The rear portion of the rotatable superstructure 12 having the radiator space 35 and the engine space 34 and the front portion thereof having the cabin 18 and hydraulic devices are partitioned from each other by a shielding plate 37, whereby hot air and noise generated in the rear portion of the rotatable superstructure 12 are prevented from being transmitted to the front portion of the rotatable superstructure. As to the portion where the shielding plate 37 and the rotating motor 43 interfere with each other, the shielding plate 37 is cut out and thereafter the gap between the shielding plate and the rotating motor is filled up with a soundproofing material or the like. Part of the shielding plate 37 may be substituted by, say, one side of the cabin 18. It is not always necessary for the shielding plate 37 to be provided throughout the entire portion concerned, but the shielding plate may be provided at only a required portion.

An air cleaner 44 is accommodated in the central portion of the rotatable superstructure 12, that is, between the attachment mounting portion and the shielding plate 37 and inside a guard 17 which is disposed above the rotating motor 43. A suction port 45 of the air cleaner 44 is provided on the shielding plate 37 side of an upper portion of the radiator space 35 so that air can be introduced into the air cleaner through a suction pipe 46. The air thus introduced is filtered with a filter provided within the air cleaner and is then fed to the engine 31 trough an air feed pipe 47 for use in combustion in the engine. The portions of the shielding plate 37 where the suction pipe 46 and the air feed pipe 47 interfere with the shielding plate are cut out and both pipes are inserted through the cutout portions, thereafter the resulting gaps are filled up using a soundproofing material or the like.

Since the air cleaner is thus installed inside the guard 17, there is attained an improvement in the beauty of appearance as compared with the conventional air cleaner projecting from the upper surface of the rotatable superstructure. Besides, the safety is improved because there is no fear of the rear view from the cabin being obstructed. Further, since the air cleaner 44 can be received in a very narrow space which is formed between the attachment mounting portion and the shielding plate 37 and inside the guard 17 above the rotating motor 43 and which has not been utilized effectively heretofore, there can be attained a great contribution to an effective utilization of space. Additionally, since the shielding plate 37 is present, it is not likely at all that the air cleaner will be affected by hot air of the engine and hence there is no fear of deterioration in efficiency of the engine 31.

Further, since the suction port 45 is disposed on the shielding plate 37 side of the upper portion of the radiator space 35, the proportion occupied by the air cleaner can be diminished and the passage of air is not obstructed in comparison with the case where the air cleaner is disposed directly in the radiator space. Thus, the efficiency of the radiator 32 is not deteriorated. Moreover, through the suction port 45, the air (arrow A) which has been introduced into the rotatable superstructure 12 from the exterior can be fed directly to the air cleaner 44.

Although in the above construction the suction port 45 is disposed in the radiator space 35, this constitutes no limitation. For example, the suction port 45 may be disposed on the upper surface of the guard 17. That is, the position of the suction port 45 is not specially limited insofar as it does not lead to the deterioration in efficiency of the engine or the radiator.

What is claimed is:

1. A hydraulic excavator comprising:

an upper rotating body;

a shielding plate which partitions said upper rotating body into a front portion and a rear portion, with an engine and a radiator being disposed in said rear portion;

an attachment mounting portion disposed near a center of said front portion and to which one end of an attachment is mounted; and an air cleaner for filtering the air to be fed to said engine, said air cleaner being disposed in said front portion between said attachment mounting portion and said shielding plate.

2. A hydraulic excavator according to claim 1, wherein said rear portion of the upper rotating body is partitioned into an engine space for accommodating said engine therein and a radiator space for accommodating said radiator therein, and a suction port of said air cleaner is disposed in said radiator space.

3. A hydraulic excavator according to claim 1, wherein said air cleaner is disposed inside a guard of said upper rotating body.

4. A hydraulic excavator according to claim 1, wherein said air cleaner is disposed above a rotating motor for rotating said upper rotating body.

5. A hydraulic excavator comprising: an upper rotating body partitioned into a front portion and a rear portion by means of a shielding plate;

one end of an attachment capable of rise and fall mounted to near a center of said front portion;

an engine space and a radiator space for accommodating an engine and a radiator respectively therein, said engine space and said radiator space being formed in said rear portion; and an air cleaner for filtering the air to be fed to said engine, said air cleaner being disposed in said front portion between the mounted portion of said attachment and said shielding plate.

* * * * *